United States Patent [19]

Orii et al.

[11] Patent Number: 5,092,959
[45] Date of Patent: Mar. 3, 1992

[54] ORGANIC SOLVENT SPRAY DRYER DEVICE

[75] Inventors: Takeshi Orii; Yukio Suzuki; Tamotsu Konishi; Naoki Kumagai; Hiroaki Mori, all of Tokyo, Japan

[73] Assignee: Yamato Scientific Co., Ltd., Tokyo, Japan

[21] Appl. No.: 561,937

[22] Filed: Aug. 2, 1990

[30] Foreign Application Priority Data

Apr. 27, 1990 [JP] Japan ............................... 2-44499[U]
Apr. 27, 1990 [JP] Japan ............................... 2-110598

[51] Int. Cl.$^5$ ............................................. B01D 1/18
[52] U.S. Cl. .............................. 159/4.01; 159/16.1; 159/44; 159/48.1; 159/DIG. 41; 34/54; 34/57 A; 202/234; 202/236; 203/1; 203/DIG. 22
[58] Field of Search ............... 159/48.1, 4.01, 16.1, 159/44, DIG. 41; 203/DIG. 22, DIG. 2, 49, 90, DIG. 18, 1; 202/236, 234, 206; 34/10, 57 A, 57 R, 54

[56] References Cited

U.S. PATENT DOCUMENTS

| 1,516,225 | 11/1924 | Webb | 159/48.1 |
| 2,460,546 | 1/1949 | Stephanoff | 159/48.1 |
| 2,572,857 | 10/1951 | Hall et al. | 159/48.1 |
| 2,849,430 | 8/1958 | Amos et al. | 159/4.01 |
| 3,554,265 | 1/1971 | Milian | 159/48.1 |
| 3,584,674 | 6/1971 | Nolan | 159/4.01 |
| 4,368,100 | 1/1983 | Pyves | 426/471 |
| 4,437,937 | 3/1984 | McGraw | 203/DIG. 22 |
| 4,451,330 | 5/1984 | Vitner | 159/48.2 |

FOREIGN PATENT DOCUMENTS

| 886533 | 1/1962 | United Kingdom . |
| 956712 | 4/1964 | United Kingdom . |
| 1124578 | 8/1968 | United Kingdom . |

Primary Examiner—Wilbur Bascomb, Jr.
Attorney, Agent, or Firm—Klarquist, Sparkman, Campbell, Leigh & Whinston

[57] ABSTRACT

A spray dryer device for spray drying a sample dissolved in an organic solvent is disclosed, comprising a circulation line in which an inert gas is circulated by a blower, a heater for heating the inert gas to a specified temperature, a main drying chamber provided with a spray nozzle through which the sample dissolved in the organic solvent is sprayed into the inert gas, a collector in which the powdered sample produced in the main drying chamber is collected, and a condenser in which the gaseous organic solvent is condensed and recovered. The powdered sample is obtained in this spray dryer device for spray drying organic solvents by spraying the organic solvent through the spray nozzle into the main drying chamber in which the oxygen concentration is held to a low value by the introduction of the inert gas.

5 Claims, 7 Drawing Sheets

ORGANIC SOLVENT SPRAY DRYER DEVICE

BACKGROUND OF THE INVENTION

1. Field of the Invention

The present invention relates to a spray dryer device, and more particular to a spray dryer device for spray drying a sample dissolved in organic solvents.

2. Description of the Prior Art

Conventionally, an organic solvent spray dryer device for spray drying a sample dissolved in organic solvents is commonly known as a means for preparing samples in powder form.

The spray dryer device for spray drying the sample dissolved in the organic solvents is designed to obtain samples in powder form by spraying a sample dissolved in an organic solvent through a nozzle into a drying chamber.

However, conventional spray dryer devices are large units for commercial production and are not suitable for use in experimental laboratories or research laboratories, or the like.

In addition, when such spray dryer devices are used over a long period of time the tip of the spray nozzle tends to become clogged. In such a case the operation must be halted and the spray nozzle removed for cleaning. However, when the operation is temporarily halted, air enters the drying chamber and the oxygen concentration is increased, so that the oxygen concentration in the chamber must once again be lowered to operating conditions, which takes a considerable time. This is undesirable in maintaining operating efficiency. In addition, when the spray nozzle is removed during operation outside air suddenly enters to increase the oxygen concentration in the drying chamber, causing concern that this oxygen will react with the gaseous organic solvent to cause an explosion.

SUMMARY OF THE INVENTION

A main object of the present invention is to provide, with due consideration to the drawbacks of such conventional devices, an organic solvent spray dryer device which is suitable for use in experimental laboratories or research laboratories, or the like, and which has superior safety features.

Another object of the present invention is to provide an organic solvent spray dryer device which has superior operating efficiency.

These objects are achieved in the present invention by the provision of an organic solvent spray dryer device comprising a circulation line for circulating an inert gas; a blower for the forced circulation of the inert gas in the circulation line; a heater for heating the inert gas to a specified temperature; a main drying chamber into which the inert gas is introduced; a spray nozzle, installed in a freely removable manner in the main drying chamber, through which a sample dissolved in an organic solvent is sprayed into the main drying chamber; a collector in which a powdered sample produced in the main drying chamber is collected; and a condenser in which the gasified organic solvent is condensed and recovered.

In the present invention, the powdered sample produced by spraying the organic solvent in which the sample is dissolved through the spray nozzle into the main drying chamber in which the inert gas is being circulated is collected in the collector. In addition, the gasified organic solvent is condensed in the condenser.

Because the present invention comprises a heater, a main drying chamber, a collector, and a condenser in a circulating line, the device can be made very small, the inert gas is easily handled, and safety is improved. In addition, the operating efficiency is improved.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

One embodiment of the spray dryer device for spray drying organic solvents of the present invention will now be explained in detail with reference to FIGS. 1 to 10.

Figure 1:
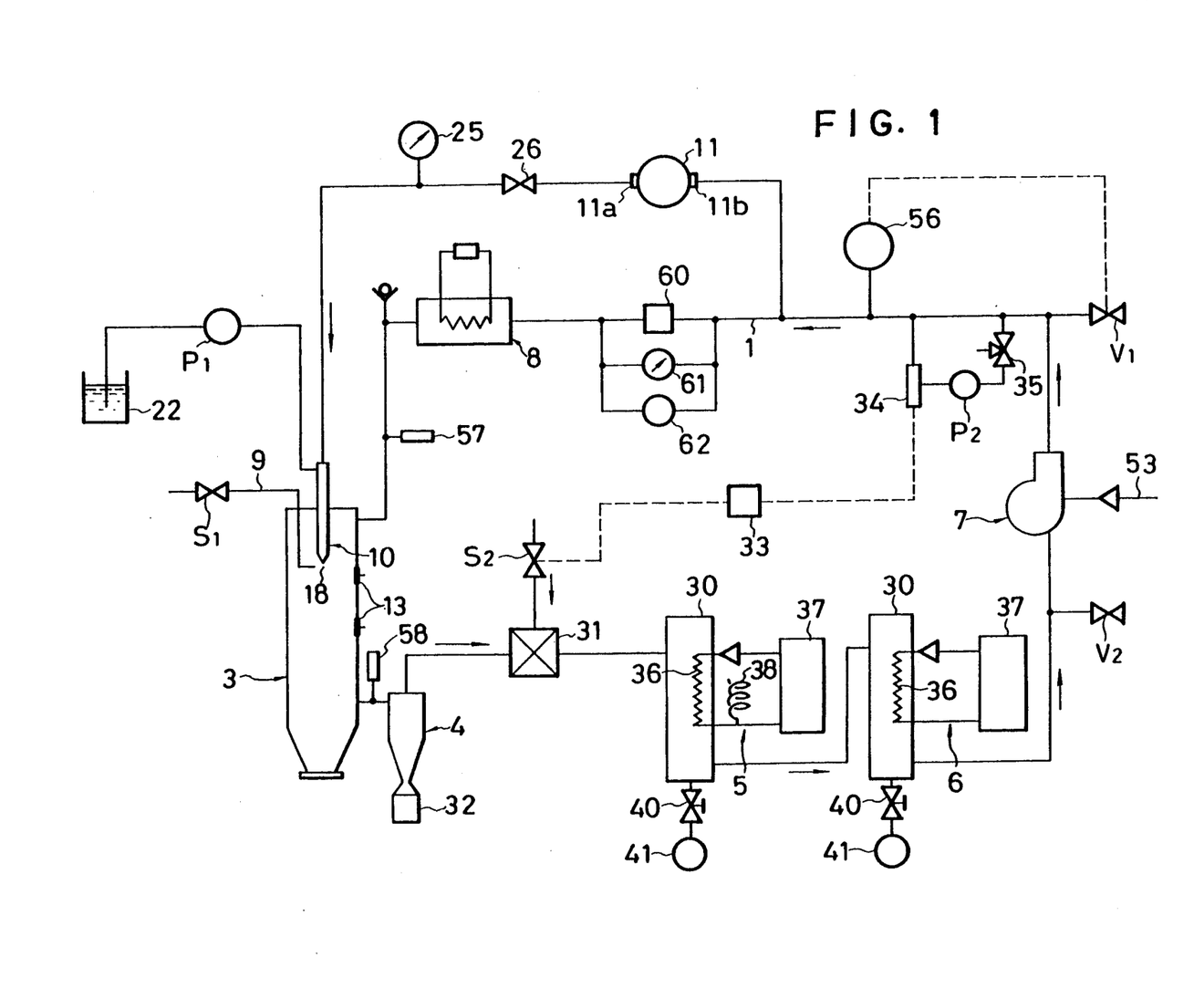
FIG. 1 is a complete configuration diagram showing one embodiment of the organic solvent spray dryer device of the present invention.

Now referring to FIG. 1, a circulating line 1 is provided through which an inert gas such as nitrogen gas is circulated. This inert gas flows via the circulating line 1 through a main drying chamber 3, a cyclone 4, a first condenser 5, a second condenser 6, a blower 7, and a heater 8, in that order.

Figure 2:
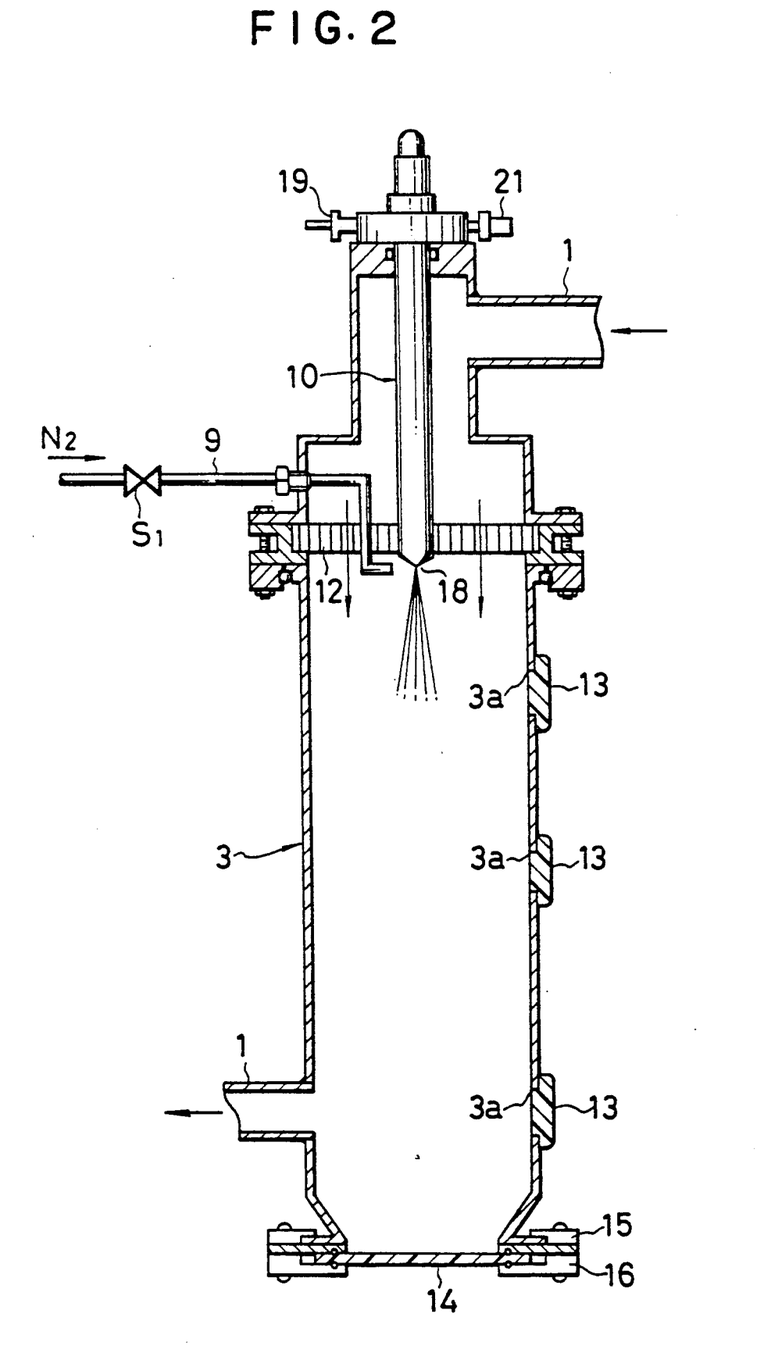
FIG. 2 is a vertical sectional drawing showing a main drying chamber provided for this embodiment of the present invention.

The main drying chamber 3, as shown in FIG. 2, is constructed in the form of a cylinder from a transparent glass material, and is provided with a first control valve $S_1$ through which the inert gas is fed via a pipe 9 or the like which forms a supply channel.

The first control valve $S_1$ can be controlled in a freely opening or closing manner by a manually operated switch provided on a control panel (omitted from the drawing) and a spray nozzle sensor C which will be later described.

Figure 3:
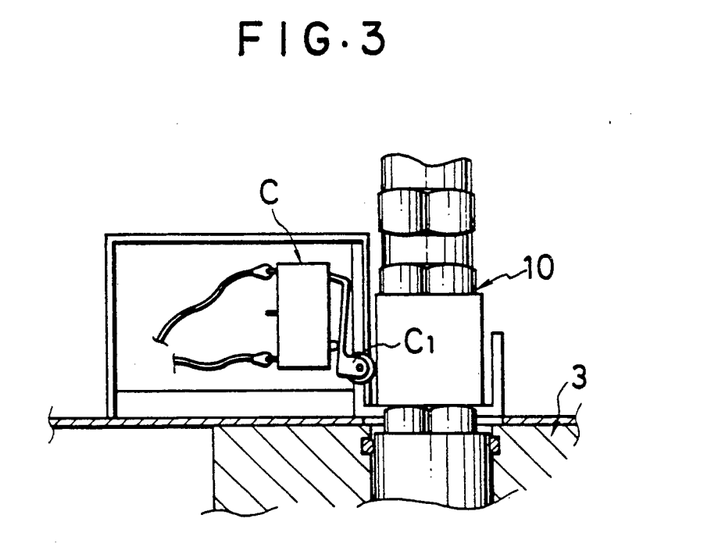
FIG. 3 and FIG. 4 are enlarged drawings showing a spray nozzle sensor provided in the main drying chamber of this embodiment.
Figure 4:
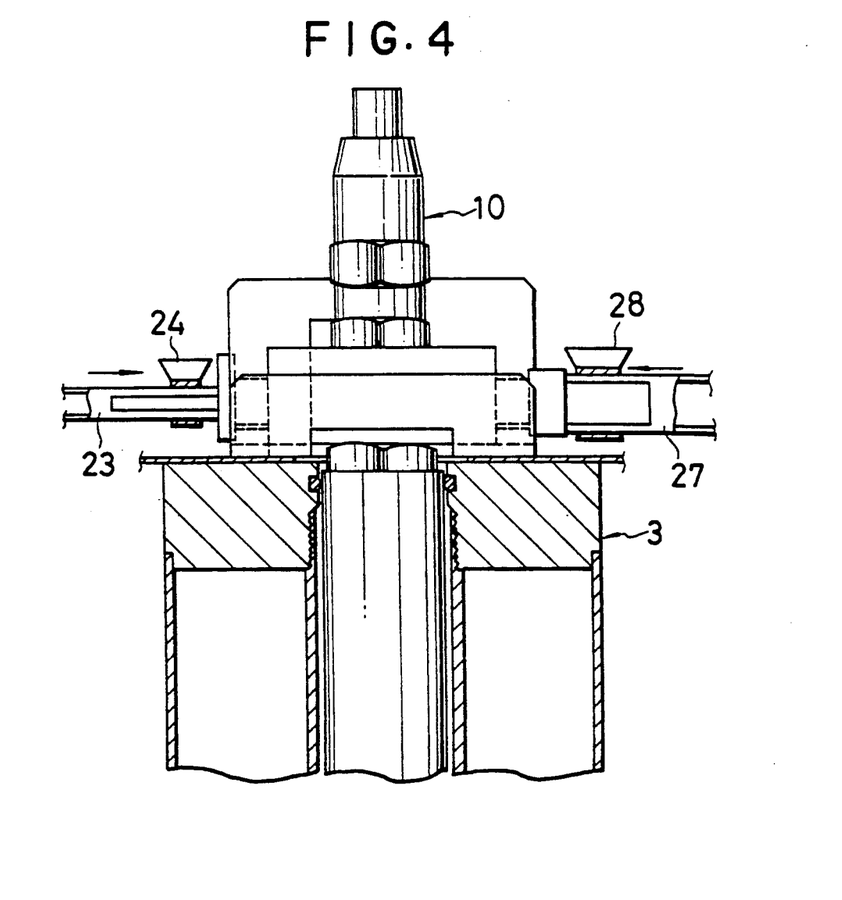

The spray nozzle sensor C, as shown in FIG. 3, is fixedly supported at the upper end of the main drying chamber 3 by a bracket. A switching element $C_1$ on the spray nozzle sensor C detects the presence or absence of a spray nozzle 10, and has the function of opening the first control valve $S_1$ and halting the operation of a compressor 11 which will be later described when the spray nozzle 10 is removed.

Figure 5:
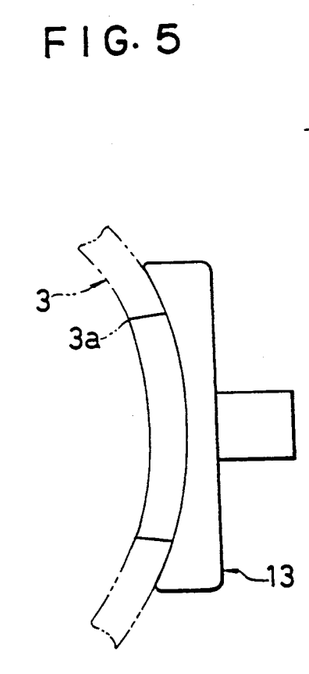
FIG. 5 is an enlarged drawing showing a cap installed on the main drying chamber of this embodiment.

The spray nozzle 10 through which the organic solvent is sprayed, and a honeycomb-type rectifier plate 12 for directing the flow of solvent from the top to the bottom of the main drying chamber 3 are provided at the upper end of the main drying chamber 3. A pipe which forms the circulation line 1 is connected to the main drying chamber 3 on the upstream side of the rectifier plate 12. A plurality of pressure relief caps 13 and a rupture disc 14 are provided in the main drying chamber 3 with the function of relieving the internal pressure in the chamber 3 whenever this pressure exceeds a specified value. The pressure relief caps 13 are installed in the peripheral surface of the chamber 3, each inserted into its own engaging hole 3a; the rupture disc 14 is installed at the bottom of the chamber 3, with its peripheral edge interposed between an upper bracket 15 and a lower bracket 16. FIG. 5 is an enlarged drawing showing details of the caps 13.

Figure 6:
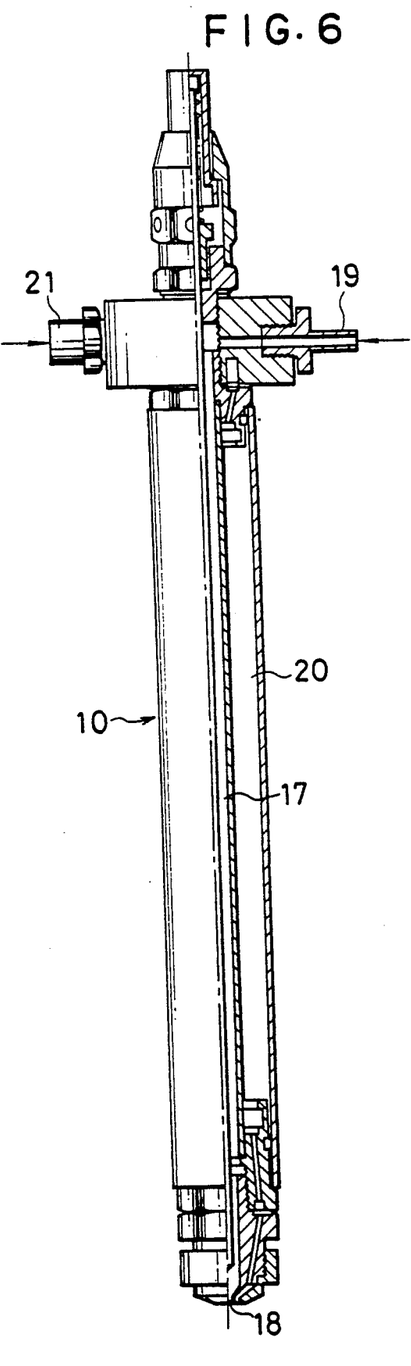
FIG. 6 is a partial sectional drawing showing a spray nozzle provided in the main drying chamber of this embodiment.
Figure 7:
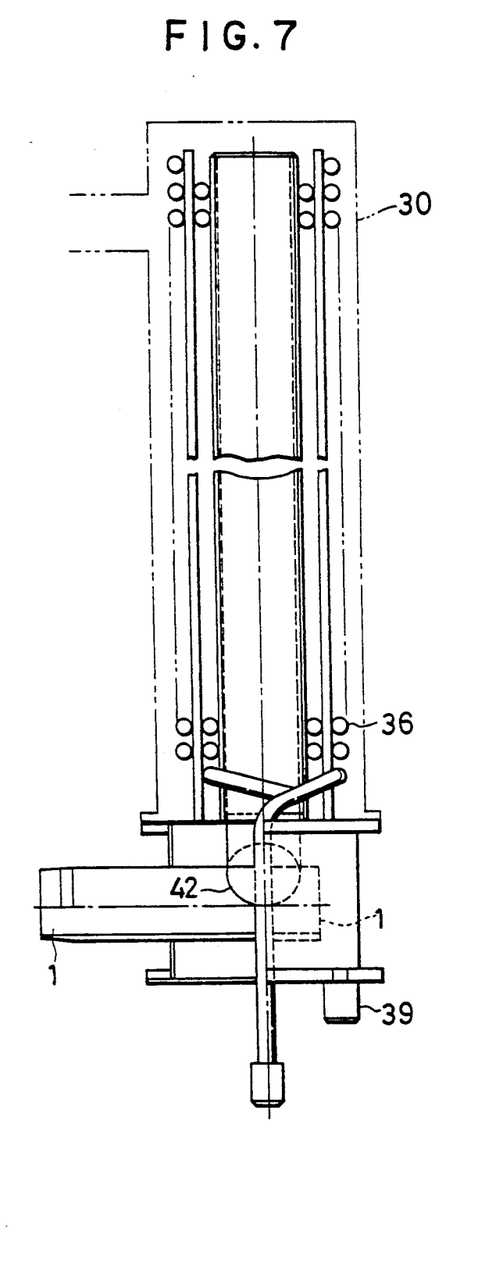
FIG. 7 is a structural drawing showing a condenser provided in this embodiment.
Figure 8:
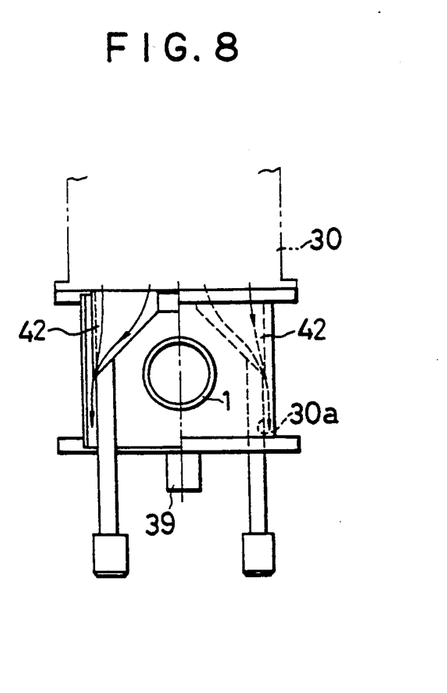
FIG. 8 is a structural drawing showing an induction tube provided at the bottom of the condenser of FIG. 7.
Figure 9:
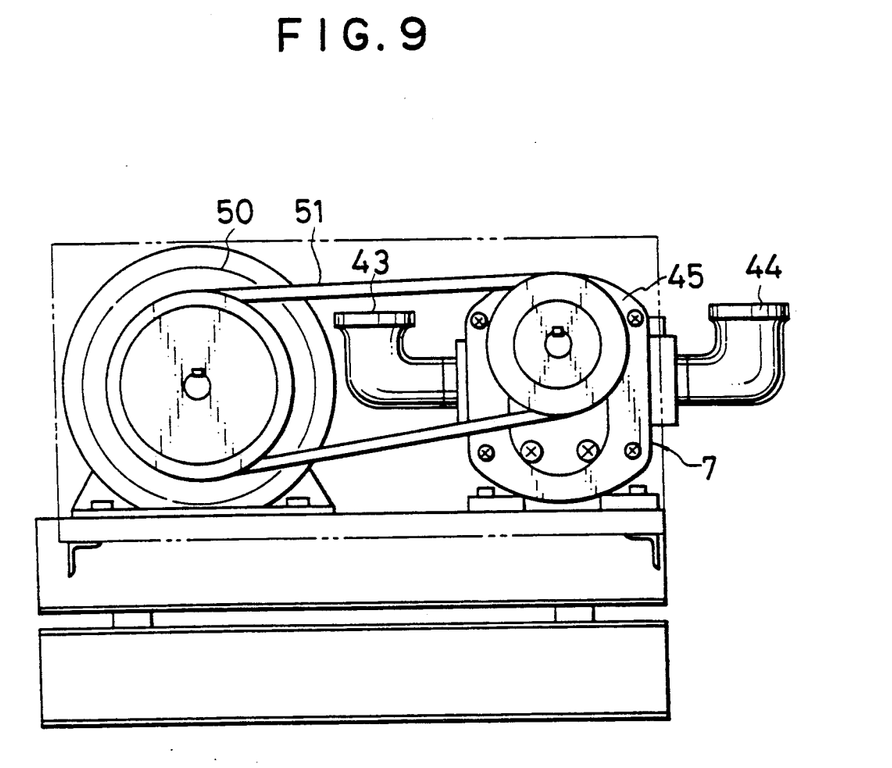
FIG. 9 is a side view of the blower provided in this embodiment of the present invention.
Figure 10:
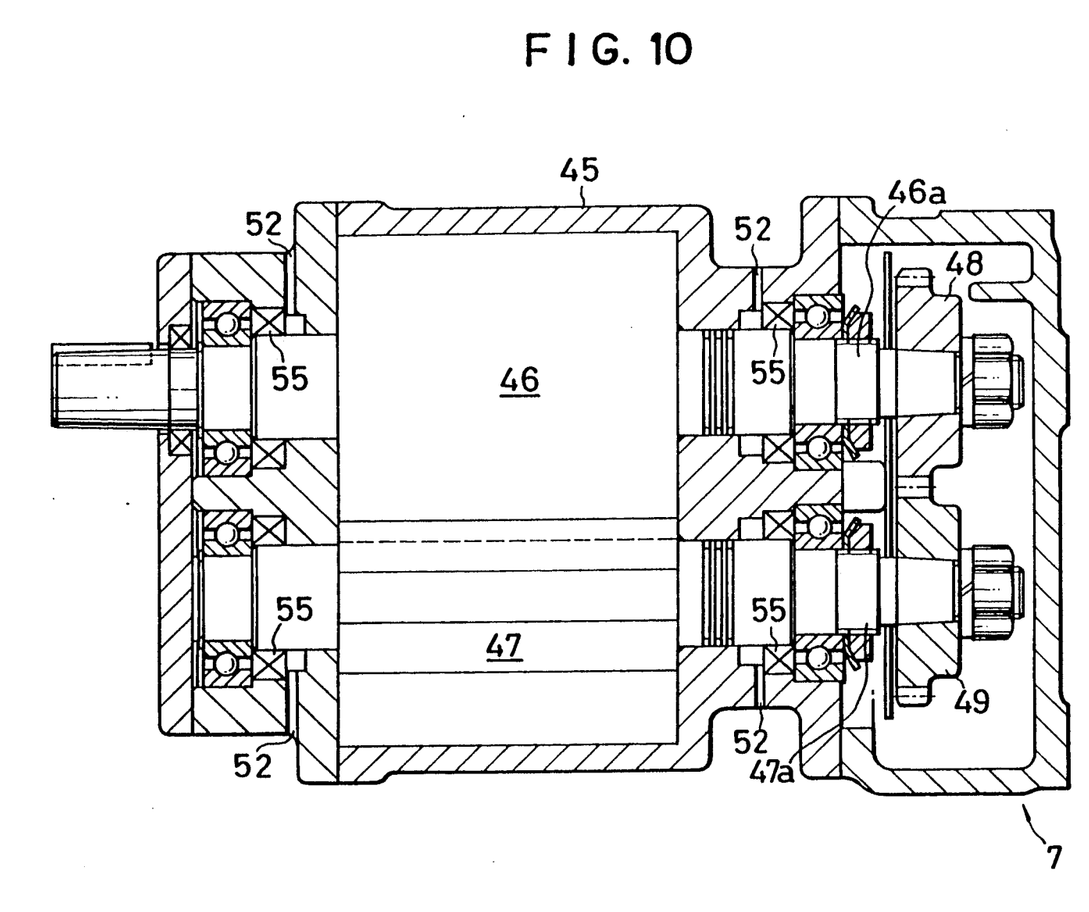
FIG. 10 is a sectional drawing of the blower of FIG. 9.

The spray nozzle 10, as shown in FIG. 6, comprises a first connection port 19 which passes through a central passage 17 and extends to a nozzle tip 18, and a second connection port 21 which passes through an external passage 20 which forms the outside of the central passage 17 and extends to the nozzle tip 18. The nozzle tip 18 is directed downward from the rectifier plate 12. The rectifier plate 12 ensures that the spray is directed into the middle of a straight stream of inert gas with no turbulence so that adherence of the powdered sample to the sidewalls of the main drying chamber is minimized and the recovery ratio is increased. The first connection port 19 is connected to a pipe 23 in a freely removable manner by a clamp fixture 24 (see FIG. 4). The pipe 23 runs from a sample pump $P_1$ which is connected to a tank 22 which contains the organic solvent.

The second connection port 21 is connected in a freely removable manner by means of a clamp fixture 28 to a pipe 27 which is connected through a pressure gauge and a needle valve 26 to an outlet port 11a of a compressor 11. The inlet port of the compressor 11 is connected to the circulation line 1. By this configuration, the inert gas delivered from the compressor 11 and the organic solvent discharged from the sample pump $P_1$ are fed into the spray nozzle 10 and are sprayed into the main drying chamber 3 from the nozzle tip 18.

A spiral flow path (omitted from the drawings) is provided inside the cyclone 4 which is connected to the bottom of the main drying chamber 3. In addition, the cyclone 4 is connected to a condensing chamber 30 in the first condenser 5 through a filter 31. A detachable collector casing 32 which collects the powdered sample produced in the main drying chamber 3 is provided on the bottom of the cyclone 4.

A second control valve $S_2$ controlled from a control section 33 is connected to the filter 31. The second control valve $S_2$ is controlled to freely open or shut in response to a detection signal from an oxygen concentration sensor 34 which detects the oxygen concentration in the circulation line 1. Accordingly, when the oxygen concentration in the circulation line 1 exceeds a specified concentration, the second control valve $S_2$ opens in response to the detection signal from the oxygen concentration sensor 34, and inert gas from an outside tank is fed into the circulation line 1 to ensure that the oxygen concentration in the circulation line 1 is reduced below a set concentration.

The oxygen concentration sensor 34 detects the oxygen concentration in the air to obtain a standard value for the measurement of the oxygen concentration in the circulation line 1. Specifically, one port of a three-way valve 35 which is connected to the oxygen concentration sensor 34 through a pump $P_2$ is opened to the air.

Accordingly, when the valve 35 is opened to the air, the air from the pump $P_2$ is delivered to the oxygen concentration sensor 34 so that the concentration of oxygen in the air can be determined.

Each of the first and second condensers 5, 6 comprises a condensing chamber 30 which contains a double-screw cooling tube 36 which strips the latent heat from the surrounding atmosphere, and a refrigerator device 37 through which a refrigerant gas for the cooling tube 36 is circulated. The first and second condensers 5, 6 are connected in series so that the inert gas flows from the condensing chamber 30 of the first condenser 5 to the condensing chamber 30 of the second condenser 6. The refrigerator device 37 is controlled by a sensor 38 which monitors the cooling temperature in the cooling tube 36. In this way, the gaseous solvent which spirals around the cooling tube 36 is condensed to form a liquid which flows downward to a drain port 39, then into a recovery tank 41 through a drain cock 40.

In this case, as shown in FIG. 7 and FIG. 8, an induction tube 42 is provided for guiding the liquid toward an inner wall surface 30a at the bottom of the condensing chamber 30 so that the liquid is not absorbed from the circulation line 1 bordering on the inside bottom of the condensing chamber 30 when it flows downward. The liquid is transmitted to the inner wall surface 30a by the induction tube 42 and flows to the drain port 39.

The blower 7, as shown in FIG. 9 and FIG. 10, comprises a drive rotor 46 and a follower rotor 47 positioned inside a housing casing with a suction port 43 and a discharge port 44. A pair of normally engaged transmission gears 48, 49 are provided, one each on a rotor shaft 46a and a rotor shaft 47a for the rotors 46, 47 respectively. The drive rotor 46 is driven by a motor 50 through a transmission belt 51. The RPM of the motor 50 is controlled by inverter control to adjust the output of the blower 7.

A pair of channels 52, 52 communicate with the rotor shafts 46a, 47a at the input side of the rotors 46, 47 respectively. Inert gas is fed to the channels 52, 52 through a pipe 53 running from the outside tank. The inert gas fed to the channels 52, 52 passes along the surface of the rotor shafts 46a, 47a and is fed into the housing casing 54.

As a result of the positive flow of inert gas around the rotor shafts 46a, 47a into the housing casing 45 any gaseous organic solvent which cannot be recovered in the first and second condensers 5, 6 is prevented from entering the housing casing 45. Therefore, this gas has no detrimental effect on a pair of seal members 55 on the rotor shafts 46a, 47a.

A valve $V_1$ and a valve $V_2$ which can be opened or closed to the atmosphere are provided at the suction port 43 and the discharge port 44 respectively of the blower 7. These valves $V_1$, $V_2$ can be freely opened or closed, controlled by a manual switch on the control panel (omitted from the drawings). In addition to this manual switch, the opening and closing of the valve $V_1$ at the discharge port 44 can be freely controlled by a pressure detection switch 56 which senses the pressure in the circulation line 1. When the pressure in the circulation line increases, a signal from the pressure detection switch 56 opens the valve $V_1$.

The heater 8 controls the temperature of the circulating gas at the inlet of the main drying chamber 3 to a specified temperature by means of a first temperature sensor 57 provided in the circulation line 1 at the inlet of the main drying chamber 3.

The outlet temperature of the main drying chamber 3 is sensed by a second temperature sensor 58 provided at the outlet side of the main drying chamber 3 in the circulation line 1. A signal from the second temperature sensor 58 is sent to a thermometer provided on the external control panel for visual monitoring by an operator. When a temperature exceeding 45° C. is detected by the first temperature sensor 57, the control section 33 will halt the operation, but the fan 7 can continue to run.

An orifice 60 is shown in FIG. 1. A differential pressure gauge 61 and a pressure sensing switch 62 are connected in parallel with the orifice 60. When the flow to the heater 8 falls below a specified volume, this is detected through the orifice 60, the differential pressure gauge 61 and the pressure sensing switch 62, and an alarm such as a buzzer or the like is activated.

The organic solvent spray dryer device of this configuration is operated by first throwing a main switch to open the valve $V_1$ and the first control valve $S_1$ so that the inert gas enters the circulation line 1 to purge the oxygen. After the oxygen concentration falls below the specified value, the valve $V_1$ and the first control valve $S_1$ are closed.

Subsequently, the oxygen concentration in the circulation line 1 is maintained below the specified value by opening or closing the second control valve $S_2$ in response to the signal from the oxygen concentration sensor 34.

Next, the organic solvent is sprayed into the main drying chamber 3 from the sample pump $P_1$. The powder sample produced in the main drying chamber 3 at this time is recovered in the cyclone 4. If during this operation the oxygen concentration in the main drying chamber 3 suddenly increases and the internal pressure increases as the result of an explosion, the pressure relief caps 13 and the rupture disc 14 are blown out and ruptured respectively, so that damage or destruction of the main drying chamber 3 is avoided.

The gasified organic solvent is condensed in the first and second condensers 5, 6 and reliably recovered. In addition, the gasified organic solvent is prevented from entering the seal members 55 in the fan 7 by the flow of inert gas along the rotor shafts 46a, 47a. As a result, the gaseous solvent is prevented from detrimentally affecting the seal members 55.

If the tip 18 of the spray nozzle 10 clogs up during operation, the pipes 23, 27 connected to the first and second connection ports 19, 21 are removed and the spray nozzle 10 is manually withdrawn for cleaning. When the absence of the spray nozzle 10 is detected by the spray nozzle sensor C, the first control valve $S_1$ is opened to admit the inert gas and prevent the entry of outside air by the positive pressure inside of main drying chamber 3. As a result, the inside of the main drying chamber 3 is maintained at a low oxygen concentration and a reactive explosion does not occur.

On completion of the cleaning, when the spray nozzle 10 is again inserted into the main drying chamber 3, the operation may be quickly resumed because a low oxygen concentration has been maintained in the chamber 3. This provides greatly increased operating efficiency.

Various modifications will become possible for those skilled in the art after receiving the teachings of the present disclosure without departing from the scope thereof.

What is claimed is:

1. An organic solvent spray dryer device for separating and collecting a powdered sample from a solution of the sample in an organic solvent comprising:
   a conduit for circulating an inert gas;
   a blower for the forced circulation of the inert gas in said conduit;
   a heater for heating the inert gas introduced through said conduit from said blower;
   a main drying chamber into which the inert gas is introduced through said conduit from said heater;
   a spray nozzle removably installed in said main drying chamber for spraying a sample dissolved in an organic solvent into said main drying chamber to gasify the organic solvent and produce a powdered sample;
   a collector in communication with said main drying chamber for collecting the powdered sample produced in said main drying chamber;
   a condenser in communication with said main drying chamber for condensing and recovering the organic solvent gasified in said main drying chamber;
   a conduit for introducing an inert gas into said main drying chamber;
   a control valve in said conduit for controlling the introduction of said inert gas; and
   a spray nozzle sensor for distinguishing the presence or absence of said spray nozzle in said main drying chamber and for opening said control valve when said spray nozzle is absent.

2. The organic solvent spray dryer device of claim 1 wherein said main drying chamber has an internal peripheral surface and pressure relief caps for releasing any inner pressure greater than a specified pressure on said peripheral surface.

3. The organic solvent spray dryer device of claim 1 wherein said blower is provided on the downstream side of said condenser as determined by the direction of flow of the inert gas from the main drying chamber.

4. The organic solvent spray dryer device of claim 1 wherein said collector comprises:
   a cyclone device for separating and collecting the powdered sample through rotational flow therein; and
   a collector casing communicating with the cyclone device for recovering the collected powdered sample from the cyclone device.

5. The organic solvent spray dryer device of claim 1 including means for introducing an inert gas into the conduit for circulation through the conduit and main drying chamber.

* * * * *